(12) United States Patent
Bock

(10) Patent No.: US 6,193,280 B1
(45) Date of Patent: Feb. 27, 2001

(54) EXHAUST CONNECTOR ASSEMBLY AND KIT FOR A SEGMENTED EXHAUST MANIFOLD

(75) Inventor: Allyn P. Bock, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/416,440

(22) Filed: Oct. 12, 1999

Related U.S. Application Data

(62) Division of application No. 09/120,691, filed on Jul. 22, 1998, now Pat. No. 6,032,463.

(51) Int. Cl.[7] ................................................. F16L 25/12
(52) U.S. Cl. ............................ 285/9.2; 285/31; 285/39; 285/300
(58) Field of Search ........................... 285/31, 9.2, 299, 285/300, 39

(56) References Cited

U.S. PATENT DOCUMENTS

| | | | |
|---|---|---|---|
| 3,298,680 | * | 1/1967 | Jablin ................................. 285/300 |
| 5,407,237 | * | 4/1995 | Smolowitz ........................... 285/31 |
| 5,603,531 | * | 2/1997 | Maier ................................. 285/300 |
| 5,689,954 | * | 11/1997 | Blocker et al. ..................... 285/226 |

* cited by examiner

Primary Examiner—Dave W. Arola
(74) Attorney, Agent, or Firm—Todd T. Taylor

(57) ABSTRACT

An exhaust manifold assembly for use with an internal combustion engine includes a segmented exhaust manifold with a first segment and a second segment. The first segment has an inlet end for connection with the internal combustion engine and an outlet end. The second segment has an inlet end for connection with the internal combustion engine and an additional inlet end connected with the outlet end of the first segment. An exhaust connector is connected between the outlet end of the first segment and the additional inlet end of the second segment. The exhaust connector includes an inner tubular element, an outer tubular element and a bellows. The outer tubular element is positioned radially around the inner tubular element. The bellows engages the inner tubular element and biases the inner tubular element against the first segment or the second segment. The bellows also engages the outer tubular element and biases the outer tubular element against the other of the first segment or the second segment. The exhaust connector is held in place between the segments using only compressive loading therebetween.

4 Claims, 2 Drawing Sheets

EXHAUST CONNECTOR ASSEMBLY AND KIT FOR A SEGMENTED EXHAUST MANIFOLD

This is a divisional application of application Ser. No. 09/120,691, filed Jul. 22, 1998, now U.S. Pat. No. 6,032,463.

TECHNICAL FIELD

The present invention relates to an exhaust manifold assembly for use with an internal combustion engine, and, more particularly, to an exhaust connector assembly for connecting manifold segments together in a segmented exhaust manifold assembly.

BACKGROUND ART

An exhaust manifold is used in an internal combustion engine to transport combustion products in the form of exhaust gases away from a plurality of combustion chambers within respective cylinders to the ambient environment. A conventional exhaust manifold may be formed as a single cast metal piece with a plurality of exhaust inlets which are connected with a plurality of respective cylinders and disposed in fluid communication with the corresponding combustion chambers therein.

It is also known to construct an exhaust manifold assembly as a segmented exhaust manifold assembly, including a plurality of individual segments. Each segment is typically connected with an associated cylinder of the internal combustion engine and receives combustion products therefrom. The plurality of segments are connected together using a plurality of exhaust connectors which are respectively disposed between each adjacent pair of segments. The exhaust connectors provide a fluid connection between the segments, while at the same time being configured to accommodate varying distances between the segments associated with thermal expansion and contraction during periods of operation and inoperation.

A conventional exhaust connector used between segments of a segmented exhaust manifold assembly may include an axially expandable or contractible bellows which is attached at both ends thereof to a flange (either through welding or through the use of abutting shoulders). The pair of flanges are mated with corresponding flanges disposed on an outlet end of one segment and an inlet end of another segment. A plurality of bolts extending through mating throughholes on the two pairs of adjacent flanges couple the exhaust connector between the pair of adjacent segments. The bolted connection and generally planar surfaces between the two flanges may not provide a sufficient metal-to-metal contact to ensure adequate sealing. Accordingly, gaskets and/or sealants may also be used in the flanged connection between the exhaust connector and manifold segments.

Examples of conventional exhaust connectors for use with a segmented manifold assembly are disclosed in U.S. Pat. No. 5,653,478 (McGurk, et al) and U.S. Pat. No. 3,820,829 (Hasselbacher, et al.), each of which are assigned to the assignee of the present invention.

It is also known to provide a cross-over tube which conducts fluid away from an exhaust nozzle of a gas turbine engine to a blind receiver mounted in a sidewall of an aircraft. For example, U.S. Pat. No. 5,603,531 (Maier) discloses a cross over tube for use with a gas turbine engine which includes spherical ball joints at each end thereof which are connected together via sliding tubes. One of the ball joints is held captive within a corresponding female socket of the aircraft. A bolted plate arrangement maintains the spherical ball of the cross over tube in place, while at the same time allowing a relatively small amount of angular adjustment.

The present invention is directed to overcoming one or more of the problems as set forth above.

SUMMARY OF THE INVENTION

The present invention provides an exhaust manifold assembly with an exhaust connector assembly having two sliding tubular elements which are biased in opposite axial directions against an outlet of one manifold segment and an inlet of another manifold segment using a bellows. The exhaust connector is held in place between the segments using only compressive loading therebetween.

In one aspect of the invention, an exhaust manifold assembly for use with an internal combustion engine includes a segmented exhaust manifold with a first segment and a second segment. The first segment has an inlet end for connection with the internal combustion engine and an outlet end. The second segment has an inlet end for connection with the internal combustion engine and an additional inlet end connected with the outlet end of the first segment. An exhaust connector is connected between the outlet end of the first segment and the additional inlet end of the second segment. The exhaust connector includes an inner tubular element, an outer tubular element and a bellows. The outer tubular element is positioned radially around the inner tubular element. The bellows engages the inner tubular element and biases the inner tubular element against the first segment or the second segment. The bellows also engages the outer tubular element and biases the outer tubular element against the other of the first segment or the second segment. The exhaust connector is held in place between the segments using only compressive loading therebetween.

An advantage of the present invention is that the exhaust connector interconnects adjacent manifold segments using only axial force applied by the bellows.

Another advantage is that only a metal-to-metal sealed contact is provided between the manifold segments and exhaust connector, without requiring the use of additional flanges, bolts or sealant.

Yet another advantage is that the exhaust connector may be easily and simply installed or removed between the manifold segments using a simple installation/removal tool.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

BEST MODE FOR CARRYING OUT THE INVENTION

Figure 1:
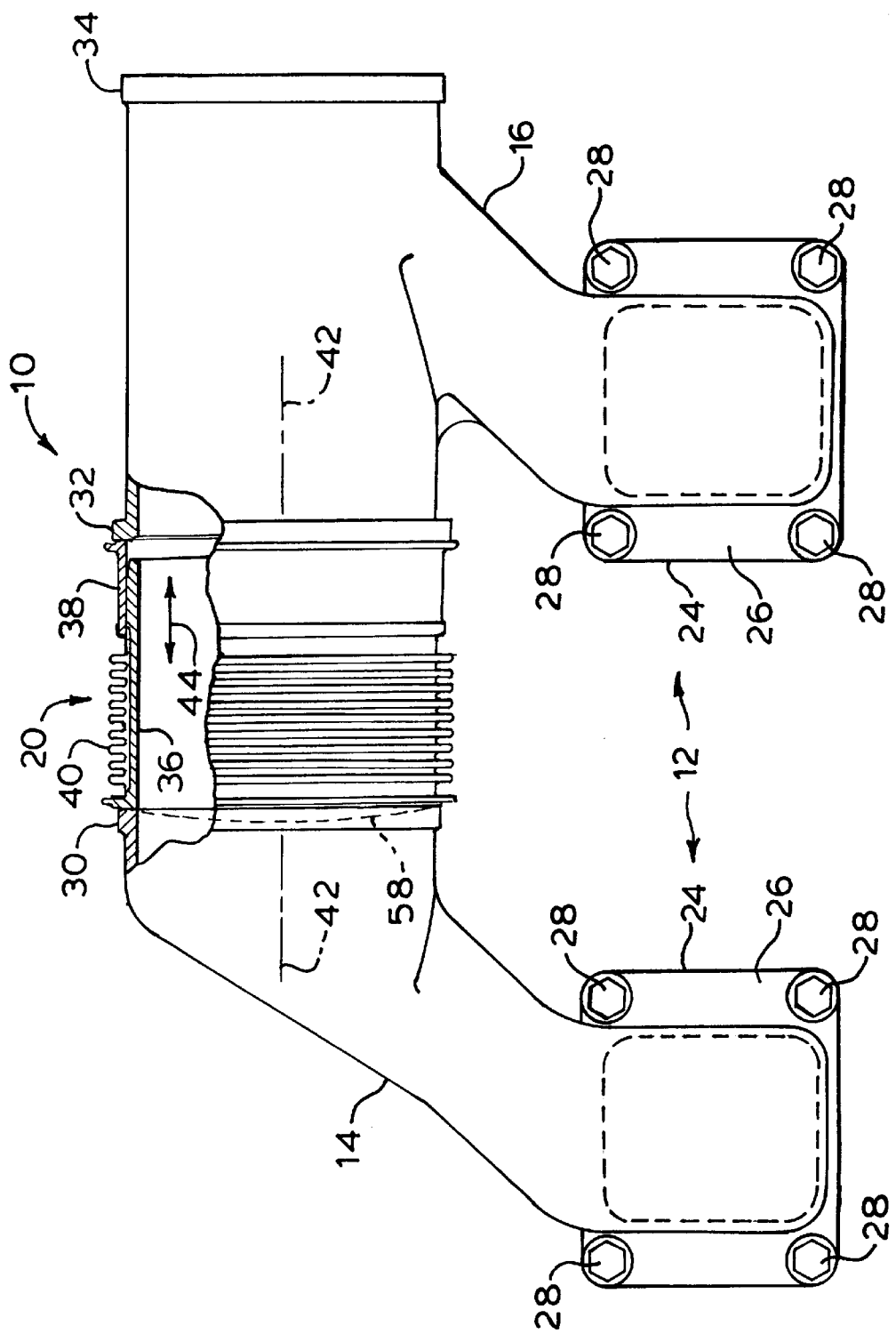
FIG. 1 is a plan, partially fragmentary view of an embodiment of an exhaust manifold assembly of the present invention.

Referring now to the drawings, and more particularly to FIG. 1, there is shown an embodiment of an exhaust manifold assembly 10 for use with an internal combustion engine (not shown). Exhaust manifold assembly 10 generally includes a segmented exhaust manifold 12 with a plurality of segments 14 and 16, and an exhaust connector kit 18 including an exhaust connector 20 and an installation/removal tool 22 which is removably coupled therewith.

Exhaust manifold 12 is a segmented exhaust manifold including a first segment 14 and a second segment 16 which each receive exhaust gas from respective cylinder heads of an internal combustion engine. More particularly, first segment 14 and second segment 16 each include an inlet end 24 with a surrounding flange 26 which is attached to a cylinder head of an internal combustion engine (not shown) using a plurality of bolts 28. Of course, suitable gaskets and gasket sealant are also likely interposed between flanges 24 and respective cylinder heads of the internal combustion engine.

First segment 14 also includes an outlet end 30 from which the exhaust gas is discharged. Outlet end 30 is coupled with a gas-tight connection with an additional inlet end 32 of second segment 16 via exhaust connector 20. Exhaust gas which is received at both inlet end 24 and additional inlet end 32 of second segment 16 is merged together and discharged from outlet end 34. Additional segments (not shown) which are similar in construction to second segment 16 are connected together in series using respective exhaust connectors 20, depending upon the number of cylinders to which exhaust manifold assembly 10 is connected. Connected in series as such, exhaust manifold assembly 10 accommodates a stack-up of thermal tolerances associated with thermal expansion and contraction during periods of use and inoperation of the internal combustion engine.

Figure 2:
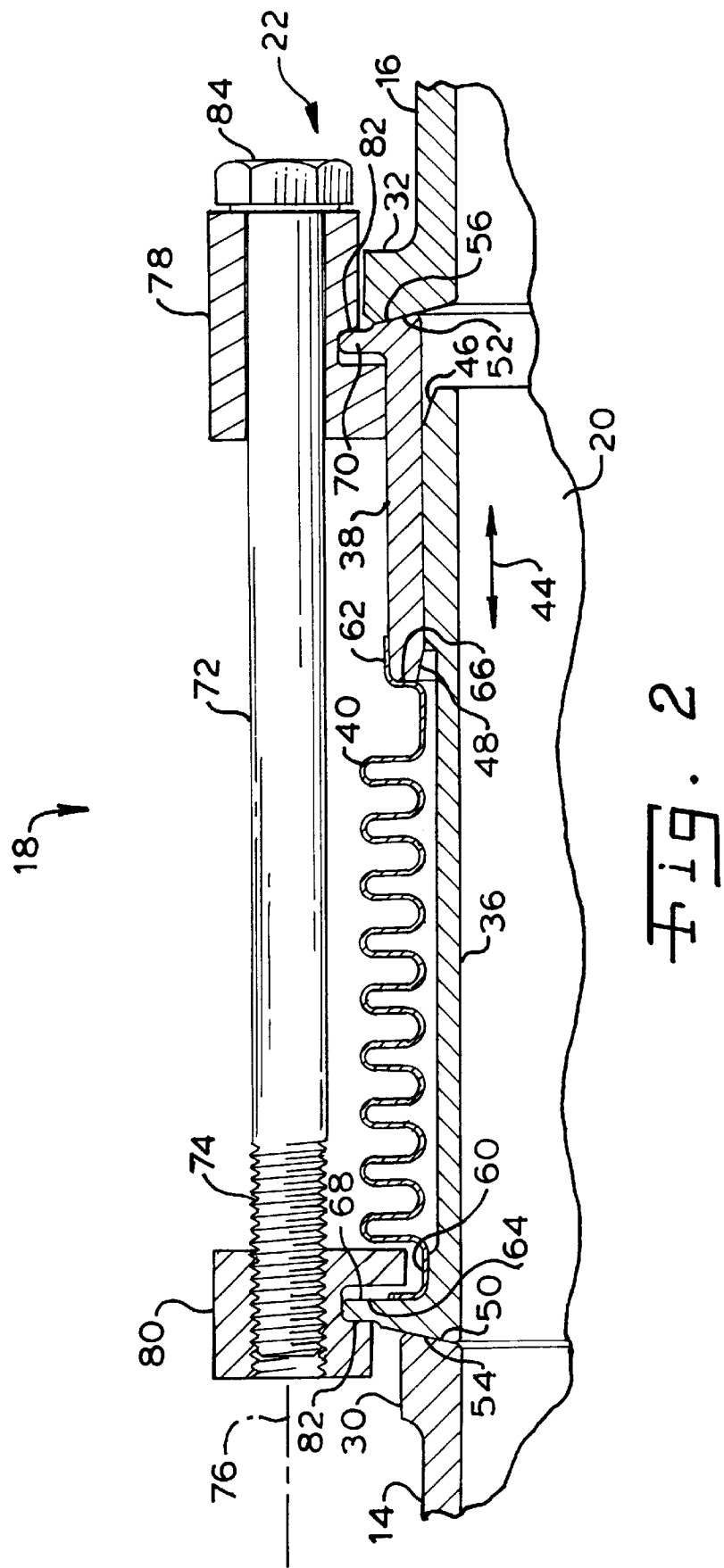
FIG. 2 is an enlarged, fragmentary sectional view of a portion of the exhaust connector shown in FIG. 1, with an embodiment of an installation/removal tool of the present invention attached therewith.

Exhaust connector 20, shown in detail in FIG. 2, is connected between outlet end 30 of first segment 14 and additional inlet end 32 of second segment 16. Exhaust connector 20 generally includes an inner tubular element 36, an outer tubular element 38, and a bellows 40, which together form a substantially gas-tight interconnection between first segment 14 and second segment 16, without requiring the use of additional flanges, bolts, sealants, etc.

Outer tubular element 38 is positioned radially around and is slidable relative to inner tubular element 36 in directions generally parallel to a longitudinal axis 42 of inner tubular element 36, as indicated by double-headed arrow 44. Each of inner tubular element 36 and outer tubular element 38 includes a small chamfer 46 and 48, respectively, which allow outer tubular element 38 to be assembled radially around inner tubular element 36. The radial tolerance between inner tubular element 36 and outer tubular element 38 may vary depending upon the specific application, but preferably is between 0.001 and 0.003 inch.

Inner tubular element 36 and outer tubular element 38 also each include an angled end face 50 and 52, respectively, which are complementary and mate with respective angled end faces 54 and 56 of first segment 14 and second segment 16. Preferably, angled end faces 50 and 52 are substantially identically configured and complementary with either of angled end faces 54 or 56 so that connector 20 may be reversed in orientation between first segment 14 and second segment 16. However, in the embodiment shown, angled end face 50 of inner tubular element 36 is positioned against angled end face 54 of first segment 14 so that the exhaust gas discharged from first segment 14 does not directly flow into the radial clearance space between inner tubular element 36 and outer tubular element 38.

Angled end faces 50 and 52 of exhaust connector 20, and correspondingly mating angled end faces 54 and 56 of exhaust manifold 12 are preferably configured so that exhaust connector 20 is substantially self-centering when installed between first segment 14 and second segment 16. More particularly, angled end faces 50, 52, 54 and 56 are formed with curved, spherical mating surfaces which accommodate radial and/or angular misalignment of exhaust connector 20 between first segment 14 and second segment 16. When viewed in cross section, angled end faces 50 and 54 on opposite sides of first segment 14 and exhaust connector 20 have a common center of curvature as indicated by phantom line 58. In the embodiment shown, inner tubular element 36 as an inside diameter of approximately 150 mm, and angled end faces 50 and 54 have a common radius of curvature of approximately 365 mm. Angled end face 52 of outer tubular element 38 and angled end face 56 of second segment 16 are substantially identically configured with angled end faces 50 and 54.

Bellows 40 is positioned radially around inner tubular element 36 and axially adjacent to outer tubular element 38. Bellows 40 includes opposite ends 60 and 62 which respectively engage ends 64 and 66 of inner tubular element 36 and outer tubular element 38. When exhaust connector 20 is installed between first segment 14 and second segment 16, bellows 40 is compressed a predetermined amount in an axial direction to provide a corresponding axial loading on each of inner tubular element 36 and outer tubular element 38 at ends 60 and 62. In the embodiment shown, bellows 40 is constructed from a single layer of stainless steel (SAE 30321) having a cross sectional thickness of between 0.004 and 0.015 inch. Thus bellows 40 forms a metal-to-metal seal with inner tubular element 36 and outer tubular element 38 at end 60 and 62. Alternatively, bellows 40 may be formed from a different material, with multiple plies of a same material or different materials, with a different cross sectional thickness and/or with a different number and/or amplitude of accordion-type bends to vary the axial loading and thus the effectiveness of the metal-to-metal seal, depending upon the specific application.

Installation/removal tool 22 is used to selectively install and remove exhaust connector 20 between first segment 14 and second segment 16. Installation/removal tool 22 is positioned at any desired location around the periphery of exhaust connector 20 and engages radially outwardly projecting extensions 68 and 70 which respectively project from end face 50 of inner tubular element 36 and end face 52 of outer tubular element 38. More particularly, installation/removal tool 22 includes an elongate member 72 in the form of a threaded bolt which includes threads 74 and defines a longitudinal axis 76. Bolt 72 slidably carries a jaw 78 and is threadingly engaged with a jaw 80. Jaw 78 is thus free to slide in a longitudinal direction relative to bolt 72, and jaw 80 moves in a longitudinal direction relative to bolt 72 upon rotation of bolt 72 relative to jaw 80. Each of jaws 78 and 80 include an abutment face 82 which engages a corresponding extension 68 or 70. When jaw 78 is against bolt head 84 and jaw 80 is further drawn towards bolt head 84 through rotation of bolt 72, extensions 68 and 70 of inner tubular element 36 and outer tubular element 38 are drawn toward each other in an axial direction, thereby compressing jaws 40 in an axial direction. When in such a compressed state, exhaust connector 20 may be installed or removed from between first segment 14 and second segment 16.

INDUSTRIAL APPLICABILITY

In use, exhaust connector 20 may be installed between first segment 14 and second segment 16 of a segmented exhausted manifold 12 by connecting installation/removal tool 22 with exhaust connector 20 as described above and compressing exhaust connector 20 in an axial direction. When in a compressed state, the axial length of exhaust connector 20 is less than the distance between outlet end 30 of first segment 14 and additional inlet end 32 of second segment 16. Exhaust connector 20 may thus be placed between first segment 14 and second segment 16. Bolt 72 of installation/removal tool 22 is then rotated to move jaw 80 away from bolt head 84, thereby allowing exhaust connector 20 to expand in the axial direction to contact each of first segment 14 and second segment 16. Spherical end faces 50 and 52 of exhaust connector 20, and 54 and 56 of exhaust manifold 12 accommodate angular and radial misalignment during installation and allow exhaust connector 20 to be substantially self aligning between first segment 14 and second segment 16. Thus installed, exhaust connector 20 provides a substantially gas-tight connection between first segment 14 and second segment 16 during operation of the internal combustion engine. To remove exhaust connector 20 from exhaust manifold 12, installation/removal tool 22 is again attached to exhaust connector 20 in a manner as described above and used to compress exhaust connector 20 in an axial direction. When in a compressed state, exhaust connector 20 may again be easily removed from between first segment 14 and second segment 16.

Other aspects, objects and advantages of this invention can be obtained from a study of the drawings, the disclosure and the appended claims.

What is claimed is:

1. An exhaust connector kit for connecting an exhaust connector between segments of a segmented exhaust manifold assembly, said exhaust connector kit comprising:

an exhaust connector including an inner tubular element, an outer tubular element and a bellows, said bellows having a pair of ends, said inner tubular element defining an axis, said outer tubular element positioned radially around and in slidable, substantially sealing contact in an axial direction with said inner tubular element, said bellows positioned between and engaging each of said inner tubular element and said outer tubular element, said bellows configured for sealingly compressing one of said ends thereof against said inner tubular element and an other of said ends thereof against said outer tubular element when said exhaust connector is mounted between two said segments, said bellows thereby configured for biasing said inner tubular element against one of said segments and for biasing said outer tubular element against an other of said segments; and an installation/removal tool for moving said inner tubular element relative to said outer tubular element, said tool including an elongate member defining a longitudinal axis and a pair of jaws carried by said elongate member, at least one of said jaws being movable relative to an other of said jaws in a direction parallel to said longitudinal axis, one of said jaws configured for connection with said inner tubular element and an other of said jaws configured for connection with said outer tubular element, said inner tubular element being relatively movable with said one of said jaws and said outer tubular element being relatively movable with said other of said jaws.

2. The exhaust connector kit of claim 1, wherein said elongate member comprises a threaded rod which is threadingly connected with at least one of said jaws.

3. The exhaust connector kit of claim 2, wherein said threaded rod comprises a bolt, one said jaw slidably carried by said bolt and an other said jaw threadingly engaged with said bolt.

4. The exhaust connector kit of claim 1, wherein each of said inner tubular element and said outer tubular element include and end face with a radially outwardly projecting extension, one of said jaws including an abutment face for engaging one said extension and an other said jaw including an abutment face for engaging an other said extension.

* * * * *